UNITED STATES PATENT OFFICE.

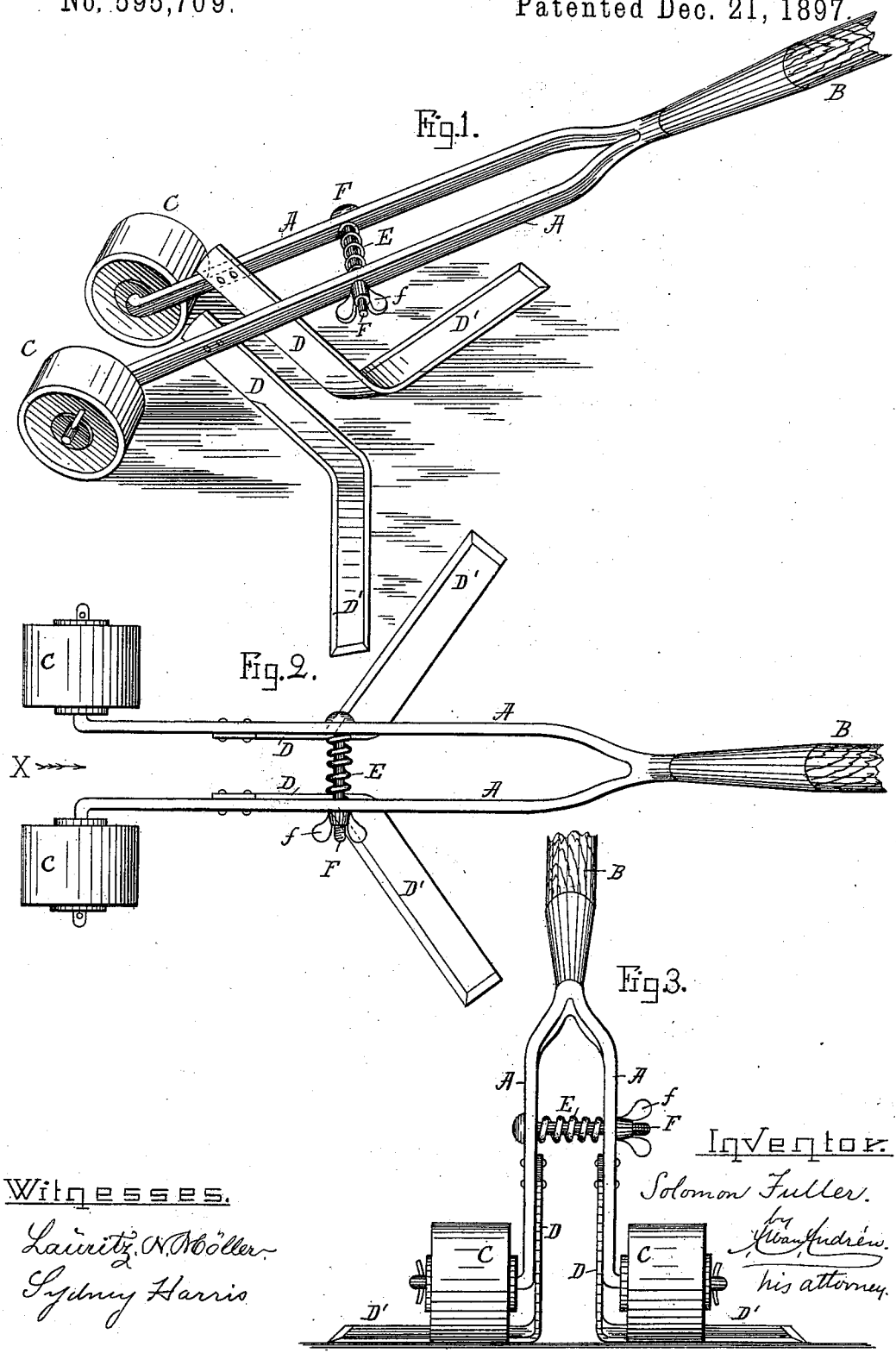

SOLOMON FULLER, OF DANVERS, MASSACHUSETTS.

WEED-CUTTER.

SPECIFICATION forming part of Letters Patent No. 595,709, dated December 21, 1897.

Application filed March 5, 1897. Serial No. 625,998. (No model.)

*To all whom it may concern:*

Be it known that I, SOLOMON FULLER, a citizen of the United States, and a resident of Danvers, in the county of Essex and State of Massachusetts, have invented new and useful Improvements in Weed-Cutters, of which the following, taken in connection with the accompanying drawings, is a specification.

This invention relates to improvements in weed-cutters for weeding beets, parsnips, and other vegetables usually planted in rows, and it is carried out as follows, reference being had to the accompanying drawings, wherein—

Figure 1 represents a perspective view of my improved weed-cutter. Fig. 2 represents a top plan view of the same, and Fig. 3 represents an end view as seen from X in Fig. 2.

Similar letters refer to similar parts wherever they occur on the different parts of the drawings.

In the drawings, A A represents a bifurcated laterally yielding or expansive metal frame, to the upper rear end of which is secured in a suitable manner a rod or handle B, of any desired length, adapted to be held by the operator during the weeding operation. To the forward free ends of the bifurcated frame A A is preferably journaled a pair of wheels or rollers C C, adapted to roll on the ground in front of the weed-cutters on opposite sides of the row of plants that are to be weeded. Instead of such rollers may be used stationary guides or shoes attached to the said free ends of the bifurcated frame A A or, if so desired, such rollers or guides may entirely be dispensed with without departing from the essence of my invention.

To each of the members A of the bifurcated frame is attached a rearwardly-inclined cutter-bar D, the lower end of which terminates as a horizontal or nearly horizontal weed-cutter blade D', preferably more or less inclined toward the axial line of the apparatus, as shown in Figs. 1 and 2, so as to readily cut the weeds and disintegrate the soil on opposite sides of the row of the plants or vegetables when the weed-cutter is moved forward by the operator.

For the purpose of regulating the distance of the cutter-blades D D' D D' from each other, according to the nature of the plants or the closeness to which the weeding is to be done, I use in connection with the expansive or adjustable bifurcated frame A A a suitable regulating or adjusting device, and I have for this purpose shown in the drawings an expansive spring E, arranged between the members A A, such spring being preferably made helical and placed around a bolt F, secured to one of the members A and passing loosely through the opposite member and provided with an adjustable take-up or regulating-nut $f$, by which arrangement the members A A and their respective cutter-blades may readily be adjusted to and from each other at the will of the operator, as occasions may require.

In using the device the operator takes hold of the handle B and pushes the weed-cutter forward in such a manner as to cause the cutters D D to be guided on opposite sides of the row of the plants, and by depressing said handle more or less the inclined cutters D' D' are caused to enter the soil more or less, as may be desired, thus cutting and uprooting the weeds on either side of the row of the plants and at the same time turning over and disintegrating the soil at the sides of the row of the vegetables without injuring either the stalks, roots, or foliage of such plants.

The invention is very simple in construction, very light and portable, and can be easily operated for the purpose as above mentioned.

What I wish to secure by Letters Patent and claim is—

A weed-cutter consisting in combination, a handle, a laterally expansive and adjustable bifurcated frame attached to said handle, guide rollers or shoes arranged at the forward ends of said bifurcated frame, inclined and outwardly-flaring cutters attached to the members of the said bifurcated frame and means for laterally adjusting the said cutters substantially as and for the purpose set forth.

In testimony whereof I have signed my name to this specification, in the presence of two subscribing witnesses, on this 27th day of February, A. D. 1897.

SOLOMON FULLER.

Witnesses:
ALBAN ANDRÉN,
THEKLA ANDRÉN.